United States Patent [19]

Ross et al.

[11] Patent Number: 4,462,421

[45] Date of Patent: Jul. 31, 1984

[54] HIGH PRESSURE ELECTRICAL INSULATOR

[75] Inventors: Oakley G. Ross, Upland; Larry D. Wedertz, Mira Loma, both of Calif.

[73] Assignee: General Dynamics, Pomona Division, Pomona, Calif.

[21] Appl. No.: 403,695

[22] Filed: Jul. 30, 1982

[51] Int. Cl.³ .................... F16K 15/02; F16K 17/04; F16L 13/00
[52] U.S. Cl. .................................. 137/542; 285/53; 285/47
[58] Field of Search .................. 137/542, 560, 375; 174/85, 110; 285/47, 50, 53, DIG. 5, 119; 62/55, 514 R; 524/611

[56] References Cited

U.S. PATENT DOCUMENTS

| | | |
|---|---|---|
| 419,962 | 1/1890 | Lane . |
| 1,040,971 | 10/1912 | Wirt . |
| 1,630,657 | 5/1927 | Croker . |
| 1,871,371 | 8/1932 | Jackson . |
| 1,884,223 | 10/1932 | Rah . |
| 2,261,948 | 11/1941 | Beach . |
| 2,267,085 | 12/1941 | Dezendorf . |
| 2,413,690 | 1/1947 | Couelle . |
| 2,705,159 | 3/1955 | Pfau ................................ 285/119 |
| 2,885,224 | 5/1959 | Campbell et al. . |
| 2,885,461 | 5/1959 | Cafiero . |
| 3,503,632 | 3/1970 | Braun . |
| 3,756,273 | 9/1973 | Hengesbach ..................... 137/542 |
| 3,993,331 | 11/1976 | Schwarz ............................ 285/53 |
| 4,048,133 | 9/1977 | Adlemann et al. ................ 524/611 |
| 4,066,283 | 1/1978 | Struck ............................... 285/53 |
| 4,398,754 | 8/1983 | Caroleo et al. ................... 285/383 |

FOREIGN PATENT DOCUMENTS 497957 9/1954 Italy .
664879 1/1952 United Kingdom ............... 285/235

Primary Examiner—Martin P. Schwadron
Assistant Examiner—John S. Starsiak, Jr.
Attorney, Agent, or Firm—Henry M. Bissell; Edward B. Johnson

[57] ABSTRACT

An insulator device which couples a metallic gas delivery tube to a line leading to a detector device which requires cooling gas for operation. The insulator device of the present invention comprises a molded dielectric insulator, molded about two separated metallic end components, each of the metallic components including a nut portion to allow the insulator to be connected, on one hand to the detector device line, and on the other hand to the metallic gas delivery tube. The two metallic components are separated by a gap in order to provide the necessary electrical isolation between the two metallic end components. One metallic end component includes a built-in check valve which permits gas to flow only in the desired direction while preventing gas flow in the opposite direction. In a preferred arrangement, the metallic end components are shaped to minimize the extent of the gas force on the two metallic end components which normally would force them slightly apart so that the gas can bleed through the insulator along the outside surface thereof, thus separating the molded insulator portion from the metallic end components at their interface boundary as it goes along. The forces tending to separate the metallic end components within the connector are substantially reduced by virtue of the new shape which presents a minimum cross-sectional area to the pressurized gas in a region where the gas may apply its pressure.

25 Claims, 5 Drawing Figures

HIGH PRESSURE ELECTRICAL INSULATOR

BACKGROUND OF THE INVENTION

1. Field of the Invention

This invention relates to electrical insulators and, more particularly, to electrical insulators which are adapted to couple a metallic tubing carrying high pressure gas to a detector sensitive to stray electrical radiation.

2. Description of the Prior Art

Electrical insulator devices, including those adapted for insertion between the ends of fluid passing tubes, have been widely available in the prior art. For example, U.S. Pat. No. 1,630,657 and Italian Pat. No. 497,957 both show electrical insulator devices adapted for insertion between the ends of fluid passing tubes. U.S. Pat. No. 419,962 discloses an insulator for use between two pipes and U.S Pat. No. 1,040,971 discloses an insulator for insulating joints.

Present day technology requirements place severe design constraints on insulators which were not present in the past. For example, an infrared detector must be cooled in order to develop maximum sensitivity. The detector may be part of an infrared seeker or scanner used, for example, with helicopters or air-to-ground missles. Preferably, metal tubing is used to deliver the cooling gas to the detector. The need for an insulated coupling arises from the fact that the tubing acts like an antenna for stray electrical signals and would thus cause the detector to malfunction. However, the high pressure (up to 6000 psi), lower temperature (in the range of −423° F.) characteristics of the gas place severe design constraints on the insulator to be utilized. For example, the high gas pressures utilized would cause the coupling disclosed in the aforementioned Italian patent to fail.

It would also be advantageous if the insulator, in addition to having the capability of withstanding the high pressures and low temperatures of the gas, had the additional capability of only allowing gas flow in the desired direction while preventing gas flow in the opposite direction.

SUMMARY OF THE PRESENT INVENTION

In brief, arrangements in accordance with the present invention comprise an insulator device which couples a metallic gas delivery tube to a detector device which requires cooling gas for operation. The insulator device of the present invention comprises a molded dielectric insulator, molded about two separated metallic end components, each of the metallic components including a nut portion to allow the insulator to be connected, on one hand to the detector device, and on the other hand to the metallic gas delivery tube. The two metallic components are separated by a gap in order to provide the necessary electrical isolation between the two metallic end components. One metallic end component includes a built-in check valve which permits gas to flow only in the desired direction while preventing gas flow in the opposite direction. In a preferred arrangement, the metallic end components are shaped to minimize the effect of the gas force on the two metallic end components which normally would force them slightly apart so that the gas could bleed through the insulator along the outside surface thereof, thus separating the molded insulator portion from the metallic end components at their interface boundary as it goes along. The forces tending to separate the metallic end components within the connector are substantially reduced by virtue of the new shape which presents a minimum cross-sectional area to the pressurized gas in a region where the gas may apply its pressure.

DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
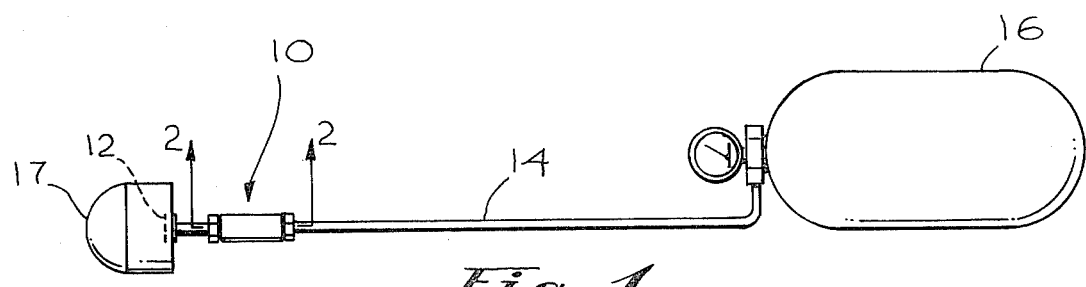
FIG. 1 illustrates, in simplified form, the component portions of the system in which the insulator of the present invention is preferably utilized.

Referring now to FIG. 1, insulator 10 of the present invention is shown coupling a detector device 12 to a metallic tubing 14 which is adapted to deliver high pressure gas from gas reservoir 16 through the insulator 10 and to the detector 12. Detector device 12, in the system illustrated, is an optical detector, specifically an infrared detector, which must be cooled in order to develop maximum sensitivity. The detector is part of an infrared seeker or scanner 17 which can be utilized, for example, with a helicopter or air-to-ground missiles. The need for insulator 10 develops from the fact that the metallic tubing 14 acts like an antenna and insulator 10 prevents stray electrical signals for causing detector 12 to malfunction.

Figure 2:
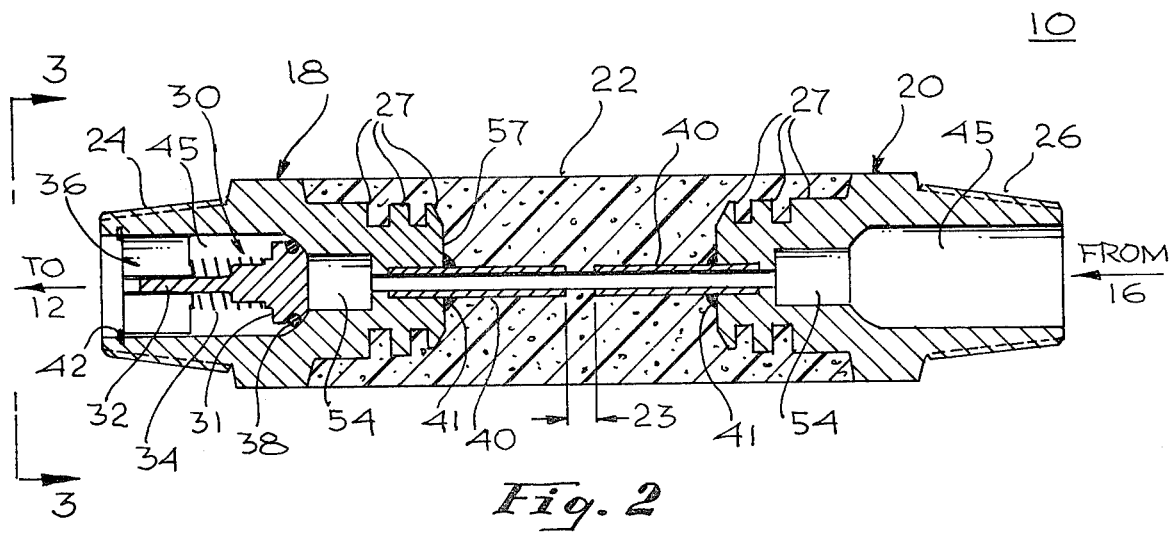
FIG. 2 is a cross-sectional view along lines 2—2 of FIG. 1 illustrating the details of the insulator of the present invention with the check valve in the closed position.

Referring to FIG. 2, insulator 10 comprises two metal components or portions 18 and 20 joined together by a high pressure injected molded dielectric material 22 and separated by gap 23. Insulator 10 is designed to operate in the range from about 3000 psi to about 6000 psi and at cryogenic temperatures in the vicinity of about −423° F. or ambient temperatures up to about +165° F., corresponding to the operating characteristics of the gas to be utilized. In the preferred embodiment, the dielectric material 20 is specified as 20% glass-filled polycarbonate resin such as available from commercial plastic supply companies although thermoplastic fluorocarbon, also commercially available, can also be utilized. The preferred gas is nitrogen or argon, although helium can also be utilized.

Insulator 10 of the present invention is manufactured by mounting two opposed metal end portions 18 and 20 in a die having a cavity into which the aforementioned dielectric material is poured as a liquid. After the liquid solidifies, the entire insulator 10 can be removed and any necessary trimming and finishing operations thereafter performed.

Figure 3:
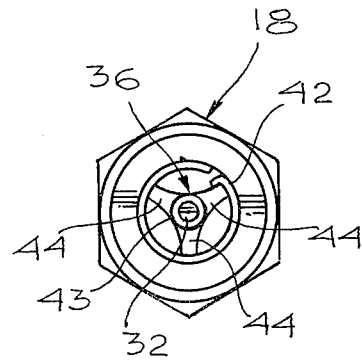
FIG. 3 shows a view, along line 3—3 of FIG. 2, of the spring stop utilized in the insulator check valve.

In essence, insulator 10 comprises metallic end portions 18 and 20 embedded in a high pressure injected molded dielectric material 22. Metallic end portions 18 and 20 preferably are made of stainless steel and both include threaded connectors 24 and 26, respectively. Metallic end portion 18 includes additional components thereof which further enhance the present invention. In particular, a check valve 30, such as that manufactured by Circle Seal Controls, Anaheim, Calif., is provided which allows gas to flow in the desired direction, i.e., from right to left as viewed from the plane of the paper while preventing gas flowing from left to right as viewed from the plane of the paper. Although FIG. 2 shows check valve 30 located within end portion 18, it may instead be located within end portion 20. As shown in FIG. 2, the check valve 30, which may be made of brass or stainless steel, comprises a trumpet-shaped head portion 31, a stem portion 32 surrounded by a spring 34 and a spider shaped spring stop 36. Spring stop 36 is designed to allow gas to flow therethrough and is illustrated in more detail in FIG. 3. A rubber O-ring 38 is formed about the head portion 31 of the valve 30. Metal tube 40, welded in place to end portions 18 and 20 by welds 41, minimizes dielectric material from getting into the central chamber of the metallic end portions during the manufacturing process. Snap-ring 42 is provided to secure spring stop 36 within cavity 45. FIG. 2, it should be noted, shows check valve 30 in the closed position. Referring to FIG. 3, spider shaped spring stop 36 comprises a central annular area 43 having three radially extending members 44 affixed thereto.

It will be noted that each of the metallic end portions 18, 20 is provided with a plurality of disk-shaped sections 27 spaced apart from each other along the extent of the end portion. Each of these disk-shaped sections 27 includes a circumferential portion extending radially outwardly from the adjacent outer surface of the end portion 18 or 20. Three such sections 27 are shown in the embodiment of FIG. 2. The inclusion of these disk or ring sections serves at least two beneficial purposes: the outwardly extending portions help to anchor the metal parts in the insulator body, and they also define a labyrinthine path for gas tending to bleed out of the insulator coupling along the surface of the metal end portion. Also a greater surface area is provided as the interface between the outer metal surface and the inner insulator surface for better adherence between the two dissimilar material surfaces.

Figure 4:
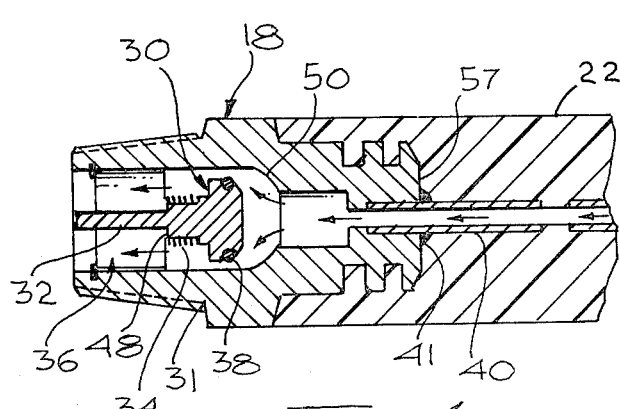
FIG. 4 is a partial cross-sectional view along line 2—2 of FIG. 1 illustrating the details of the insulator of the present invention with the check valve in the open position.

FIG. 4 (only metallic end portion 18 is illustrated) shows the gas flow (arrows) with valve 30 in the open position and also illustrates the stem portion 32 of valve 30 being forced into abutment with ridge portion 48 of spring stop 36. Rubber O-ring 38 extends about a notch formed in head portion 31 of valve 30. The shape of spring stop element 36, as set forth hereinabove, provides space for the gas to flow therethrough. O-ring 38 makes a line of contact with the conical seat 50 of the central core of metallic end portion 18 to cushion closing and to assure substanially perfect sealing.

In operation, gas from reservoir 16 is delivered to insulator 10 as shown and passes through metal end portion 20, tubes 40, gap 23, gap 54 in metallic end portion 18, valve head portion 31 (the gas flowing in the direction shown forces the valve to the open position, the position of portion 31 being limited by spring 34 becoming compressed to its limit), spring 34, annular openings 43 in spring stop 36 and then to detector 12. If the direction of the gas were reversed or if gas flow ceased, spring 34 forces head portion 31 against conical seat 50, thus preventing reverse gas flow and also permitting disassembly at detector 12 without loss of pressure in the system.

The metal tube sections 40, preferably made of stainless steel, serve a more important function than merely preventing dielectric material from flowing into the central core areas of the metallic end portions during the insulator manufacturing process. In particular, it has been found that the pressure of the gas, at the upper range of gas pressures, would tend to force the two end portions 18 and 20 slightly apart, to the point where gas can bleed through the insulator 10 along the outside surface of the metallic portion (separating the insulator and metal portions at their interface boundaries as it goes along). The forces tending to separate the metallic end portions within the insulator are substantially reduced by having the metal end components 18 and 20 present a minimum cross-sectional area to the pressurized gas in the region where the gas may apply its pressure. Metal tube portions 40, inserted and welded at 41 to the metallic end portions 18 and 20 prior to manufacturing of the insulator 10, accomplish this result.

Figure 5:
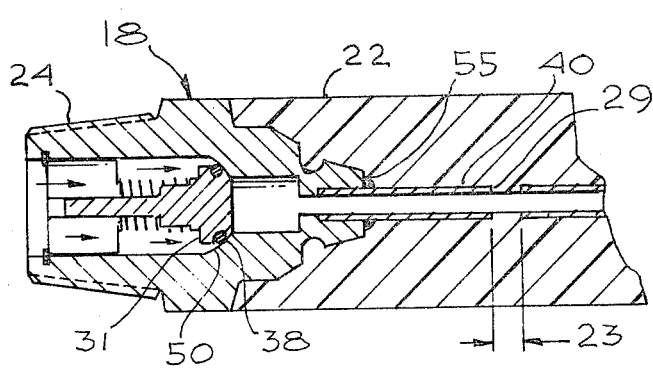
FIG. 5 is a partial cross-sectional view, along line 2—2 of FIG. 1, illustrating the details of another embodiment of the insulator of the present invention with the check valve in the closed position.

FIG. 5 illustrates an alternate embodiment of the insulator of the present invention with check valve 30 (identical in both embodiments) in the closed position. Common reference numerals identify identical components in both embodiments. FIG. 5 shows metal end portion 18 (although not shown, the external shape of the other metal end portion is identical) reshaped such that the cross-sectional area of the frontal portion of metallic end portion 18 (illustrated by reference numeral 55) is substantially reduced from the corresponding frontal area 57 shown in FIGS. 2 and 4. For example, a typical frontal area 57 for the FIGS. 2 and 4 embodiments is approximately 0.4 square inches whereas the frontal area 55 for the FIG. 5 embodiment is approximately 0.2 square inches. The frontal area 29 of tube 40 is approximately 0.1 square inches.

As set forth hereinabove, coupling insulator 10 of the present invention has been designed to meet the requirements of carrying a high pressure, low temperature gas while providing the desired electrical isolation between the two lines which it couples together. In addition, the efficient, in-line design for check valve 30 reduces the size and weight of the insulator and allows it to be mounted in any position.

Although there have been described above specific arrangements of an insulator in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An electrical insulator for providing a coupling between a pair of metallic tubes containing a pressurized fluid comprising:
 a molded insulating member forming a rigid block of electrical insulating material;
 first and second metallic end components having facing portions embedded in said insulating material by the molding of the insulating material about said portions, said portions being separated by a gap and being configured to minimize the frontal area accessible to pressurized gas in the vicinity of said gap;

a fluid passageway extending through said first end component, said insulating member and said second end component; and a valve located in said first metallic end component and movable to either an open position to allow fluid to flow from an external source through said fluid passageway in a first direction or to a closed position to prevent fluid from flowing in the opposite direction.

2. The insulator as defined in claim 1 wherein said fluid is a pressurized gas.

3. The insulator as defined in claim 2 wherein said gas is pressurized in the range from about 3000 psi to about 6000 psi.

4. The insulator as defined in claim 1 wherein said valve comprises a conical shaped head portion and a stem portion, said conical shaped head portion being in contact with a conical shaped interior seat portion of said first metallic end component when said valve is in the closed position.

5. The insulator as defined in claim 4 further including an O-ring positioned on said conical head portion, said O-ring making a line of contact with said conical shaped seat portion when said valve is in the closed position, whereby said valve closing is cushioned and substantially perfect sealing is provided.

6. The insulator as defined in claim 1 wherein said insulating material comprises a glass-filled polycarbonate resin.

7. The insulator as defined in claim 4 wherein a compression spring is affixed to said valve stem portion in a manner such that when no gas is flowing or if gas pressure would produce flow in the opposite direction, the valve is in the closed position and wherein the spring enables the valve to be in the open position when gas is flowing in said first direction.

8. The insulator as defined in claim 7 wherein a spring stop is provided on one end of said stem to limit the movement of the valve in said first direction.

9. The insulator as defined in claim 1 wherein the facing portions of said first and second metallic end components are shaped to substantially reduce the forces tending to separate them by presenting a minimun cross-sectional area to the pressurized gas in the region where the gas applies its pressure.

10. The insulator as defined in claim 1 wherein a tube member is affixed to the facing portions of said first and second metallic end components to substantially reduce the forces tending to separate them by presenting a minimum cross-sectional area to the pressurized gas in the region where the gas applies its pressure.

11. The insulator as defined in claim 1 wherein each of the end components includes at least one disk-shaped section having its periphery extending radially outward beyond the adjacent section of said end component portion.

12. The insulator as defined in claim 1 wherein each of the end components includes at least two disk-shaped sections separated by a section of lesser outside diameter than the disk-shaped sections in order to define a labyrinthine path for pressurized gas tending to leak outwardly from the fluid passageway.

13. The insulator as defined in claim 11 wherein each disk-shaped section is positioned along the associated end component in a region remote from the gap between the end components.

14. An electrical insulator for electrically isolating a first member from a second member, said first member delivering a cooling gas under high pressure to said second member, comprising:

an insulating member in the form of a block of insulating material;

first and second metallic end portions embedded in said insulting material, said end portions being separated by a gap and being configured to minimize the frontal area accessible to pressurized gas in the vicinity of said gap;

a gas passageway extending through said first end portion, said insulating member and said second end portion; and a valve located in said first metallic end portion and movable to either an open position to allow gas to flow from an external source through said gas passageway in a first direction to a closed position to prevent gas from flowing in the opposite direction.

15. The insulator as defined in claim 14 wherein said gas is pressurized in the range from about 3000 psi to about 6000 psi.

16. The insulator as defined in claim 14 wherein said valve comprises a conical shaped head portion and a stem portion, said conical shaped head portion being in contact with a conical shaped interior seat portion of said first metallic end portion when said valve is in the closed position.

17. The insulator as defined in claim 16 further including an O-ring positioned on said conical head portion, said O-ring making a line of contact with said conical shaped seat portion when said valve is in the closed position whereby said valve closing is cushioned and substantially perfect sealing is provided.

18. The insulator as defined in claim 14 wherein said insulating material comprises a glass-filled polycarbonate resin.

19. The insulator as defined in claim 16 wherein a compression spring is affixed to said valve stem portion in a manner such that when no gas is flowing or if gas pressure would produce flow in the opposite direction, the valve is in the closed position and wherein the spring enables the valve to be in the open position when gas is flowing in said first direction.

20. The insulator as defined in claim 19 wherein a spring stop is provided on one end of said stem to limit the movement of the valve in said first direction.

21. The insulator as defined in claim 14 wherein the frontal portions of said first and second metallic end portions are shaped to substantially reduce the forces tending to separate them by presenting a minimum cross-sectional area to the pressurized gas in the region where the gas applies its pressure.

22. The insulator as defined in claim 14 wherein each of the end portions includes at least one disk-shaped section having its periphery extending radially outward beyond the adjacent section of said end portion.

23. The insulator as defined in claim 14 wherein each of the end portions includes at least two disk-shaped sections separated by a section of the end portion of lesser outside diameter than the disk-shaped sections in order to define a labyrinthine path for pressurized gas tending to leak outwardly from the fluid passageway.

24. The insulator as defined in claim 22 wherein each disk-shaped section is positioned along the associated end portions in a region remote from the gap between the end portions.

25. The insulator as defined in claim 14 wherein a tube member is affixed to the frontal portions of said first and second metallic end portions to substantially reduce the forces tending to separate them by presenting a minimum cross-sectional area to the pressurized gas in the region where the gas applies its pressure.

* * * * *